Sept. 27, 1966     C. R. BAECHTEL     3,275,383
FLUID PRESSURE BRAKE SYSTEM
Filed June 19, 1964
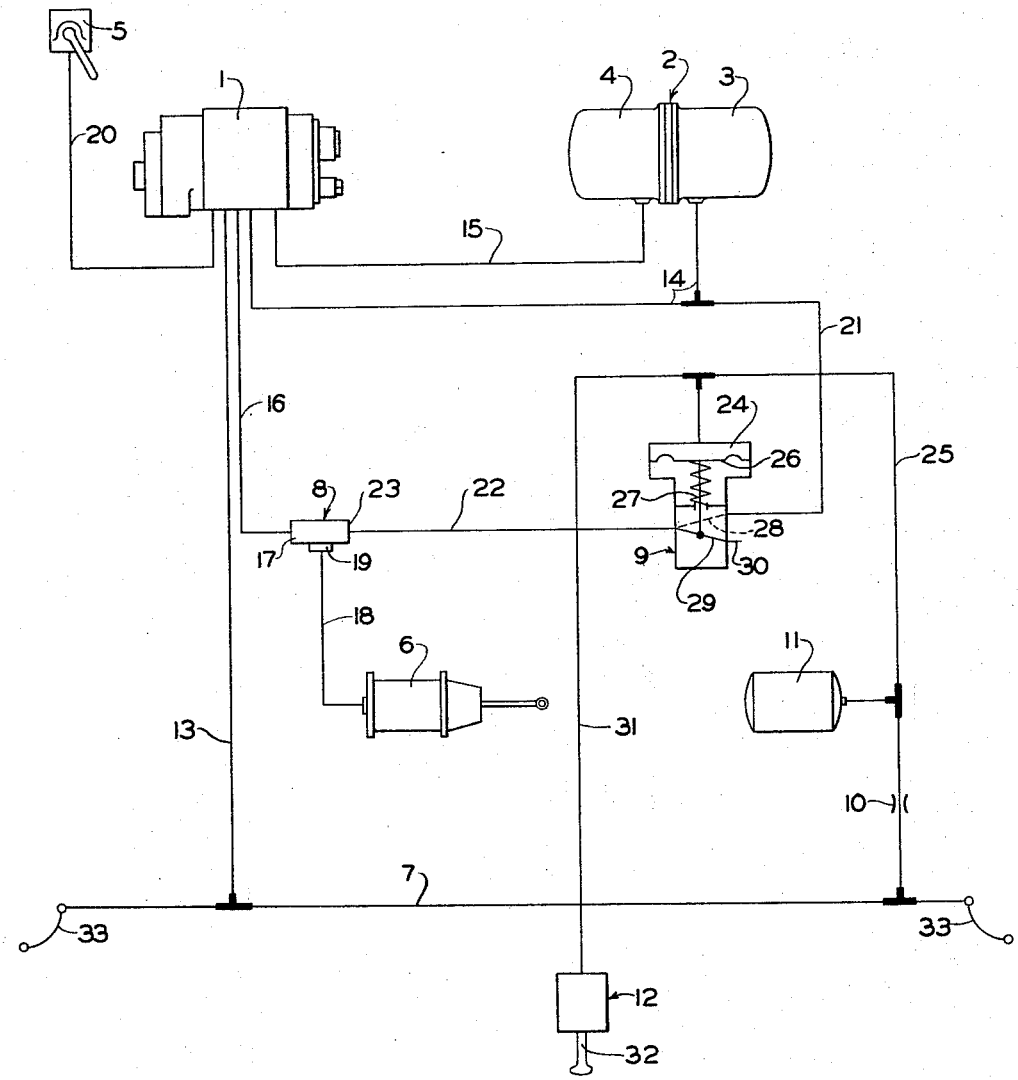
INVENTOR.
CLARENCE R. BAECHTEL
BY
*A. G. Steinmiller*
ATTORNEY 3,275,383
FLUID PRESSURE BRAKE SYSTEM
Clarence R. Baechtel, Pitcairn, Pa., assignor to Westinghouse Air Brake Company, Wilmerding, Pa., a corporation of Pennsylvania
Filed June 19, 1964, Ser. No. 376,326
13 Claims. (Cl. 303—18)

This invention relates to fluid pressure brake systems for railway vehicles and of the type comprising a fluid pressure charged brake pipe, a brake cylinder device responsive to fluid pressure and release thereof for effecting and releasing, respectively, a brake application, a source of fluid under pressure and a brake control valve device responsive to reduction and build-up of fluid pressure in said brake pipe for effecting supply and release of fluid pressure to and from, respectively, said brake cylinder device, and, more particularly, to such a brake system characterized by auxiliary means operable automatically and independently of the main brake system for selectively effecting a brake application on one or more selected cars of a number constituting a train or on a single railway car not necessarily connected to a locomotive.

In moving railway cars, particularly freight cars, from one location to another, such as in shifting yards where trains are made up, or onto a car dumper where the cars may be emptied, such cars may be moved in some instances by shifter locomotives or, in other instances, the cars are allowed to move by gravity down a grade, such as a "hump." In the case where the shifter locomotive is used, the operator uses the brake controls in the locomotive cab for stopping or "spotting" the car or cars at the desired location. Since it is essential in some instances, such as on car dumpers or at a loading and unloading platform, for example, that the car be spotted at a precise location, the locomotive operator must quite often rely on signals or verbal instructions from a person on the ground in order to spot the car or cars at the percise position for dumping, loading or unloading. In the case where the car or cars move by gravity, a brakeman usually rides the car and applies the brakes manually to stop the car or cars at the desired location. In both cases, the operations may amount to "hit or miss" situations that may result in excessive loss of time in getting the car or cars stopped precisely in the desired location.

Accordingly, the object of the present invention is to supplement existing brake equipment on railway cars with remotely controlled means automatically operable, without interference with the operation of the normal brake system, for "spotting" one or more cars, whether connected to a locomotive in a train or disconnected therefrom, at a preselected location by effecting a brake application precisely at the right moment.

According to the invention, the standard braking equipment on a railway vehicle is supplemented by a relay valve device having a control chamber normally charged with fluid pressure from the brake pipe for maintaining the relay valve device in a vent position. A trip cock device, when tripped by remotely controlled lever properly situated at a fixed point on the right of way or track, causes the pressure in the control chamber to be vented to atmosphere and thereby effect operation of the relay valve device to a supply position to connect a source of fluid under pressure, such as the emergency reservoir, to the brake cylinder devices via a double check valve device interposed between a conduit from the emergency reservoir of the standard equipment and the standard brake cylinder supply line leading from the brake control valve device of the standard equipment. The trip cock device is an automatic reset type which is preset to close after a prescribed time interval to allow build-up of fluid pressure in the control chamber of the relay valve device at a controlled or timed rate, which is thus restored to its vent position in which the brake cylinders are thus vented to atmosphere and the brakes thereby released, a predetermined time after the trip cock device closes.

The single figure drawing shows a schematic arrangement of a modified standard brake system for a railway vehicle embodying the invention.

DESCRIPTION AND OPERATION

The schematic arrangement shown in the drawing of a brake system for a railway vehicle embodying the invention comprises the standard braking equipment which consists of a brake control valve device 1, a combined source of fluid under pressure or reservoir 2 consisting of an emergency portion 3 and an auxiliary portion 4, a retaining valve device 5, a brake cylinder device 6 and a brake pipe 7 normally charged with fluid at a preselected pressure, such as 70 pounds per square inch. According to the invention, the standard braking equipment above set forth is supplemented by a double check valve device 8, a relay valve device 9, timing means including a choke 10 and a volume or reservoir 11, and a trip cock valve device 12.

The brake control valve device 1 may be any suitable device, such as the well-known Westinghouse AB control valve device. In a manner well known to those skilled in the art, the brake control valve device 1, which is connected to the brake pipe 7 via a branch conduit 13, is operatively responsive to a reduction of pressure in brake pipe 7 from its preselected pressure under the control of an engineer's brake valve device (not shown) in the locomotive cab, to effect supply of fluid under pressure from either the auxiliary portion 4 or both said auxiliary portion and the emergency portion 3 of reservoir 2, depending upon whether a service application or emergency application, respectively, is initiated, to the brake cylinder device 6 via one or both of a pair of conduits 14 and 15 connecting, respectively, said portions of said reservoir to said brake control valve device, thence via a brake cylinder supply conduit 16 leading from said brake control valve device to an inlet port 17 of the double check valve device 8, and finally via a conduit 18 connecting an outlet port 19 of said double check valve device to said brake cylinder device. Supply of fluid under pressure to the brake cylinder device 6 produces a brake application on the vehicle commensurate with the degree of pressure reduction effected in the brake pipe 7. Recharging of brake pipe 7 to its preselected pressure, under the control of the engineer's brake valve device, causes the brake control valve device 1 to effect venting of brake-applying pressure from the brake cylinder device 6 to thereby release the brake application.

The brake cylinder device 6 is vented, during the operation above described, through the brake control valve device 1 and the retaining valve device 5 which is connected to said brake control valve device via a conduit 20 and functions in a well-known manner, when operated to a pressure retaining position, to retain a predetermined minimum fluid pressure in the brake cylinder device 6 incidental to a release of the brake application has been effected.

According to the invention, the relay valve device 9 is connected via a branch conduit 21 to conduit 14 leading from the emergency portion 3 of reservoir 2 and via a conduit 22 to an inlet port 23 opposite inlet port 17 of the double check valve device 8. The relay valve device 9 comprises a control chamber 24 connected via a branch conduit 25 to brake pipe 7, said branch conduit having the choke 10 and volume 11 interposed therein with said choke being disposed between the volume and the brake pipe. A piston member 26, illustrated as of the diaphragm type, in the relay valve device 9 is subjected on one side to the force of a spring 27 acting to bias said piston member and valve means (not shown) associated therewith toward a supply position in which a communication 28, indicated schematically in the drawing by a broken line, is opened to communicate conduits 21 and 22 with each other. The other side of piston member 26 is subjected to fluid pressure prevailing in control chamber 24, which pressure, when sufficient for overcoming the opposing force of spring 27, such as 20 p.s.i. or over, for example, effects movement of said piston member and the valve means associated therewith to a cut-off position in which communication 28 is closed and a communication 29, indicated schematically in the drawing by a solid line, is opened to vent conduit 22 to atmosphere via an atmospheric vent 30. The control chamber 24 is also connected via a branch conduit 31 to the trip cock device 12 for a purpose to be immediately disclosed.

The trip cock valve device 12 is provided with trip lever 32, said trip cock device and trip lever being conveniently mounted on the car in such a position that, upon raising of a suitably located trip arm (not shown) on the wayside or right of way, said trip lever is engaged by the trip arm and caused to operate a vent valve (not shown) in said trip cock device for quickly venting conduit 31, control chamber 24 of the relay valve device 9 and timing volume 11. The trip cock valve device 12 is provided with automatic resetting means (not shown) for closing the vent valve and resetting the trip lever 32 following the venting operation and upon expiration of a preselected time interval.

The operation of the equipment will be considered first in the case where the car (or cars) to be "spotted" is connected in a train and the brake pipe 7, therefore, remains fully charged by reason of the fact that the engineer does not initiate a brake application under the control of the control valve device 1 by operating the engineer's brake valve in the locomotive cab. When the car reaches the approximate desired location on the track at which it is intended to be spotted, the raised trip arm along the wayside engages the trip lever 32 of the trip cock valve device 12 and causes rapid venting of the control chamber 24 of the relay valve device 9.

Upon venting of control chamber 24 of the relay valve device 9, spring 27 moves piston 26 and the valve means associated therewith to the supply position for opening communication 28, whereupon pressurized fluid is supplied from the emergency portion 3 of the reservoir 2 to the brake cylinder device 6 by way of conduits 14 and 21, communication 28, conduit 22, through the side of double check valve device 8 adjacent inlet port 23, and via conduit 18 to effect a temporary brake application on the vehicle.

Since the choke 10 and volume 11 are interposed between the brake pipe 7 and control chamber 24 of the relay valve device 9, the brake application caused by tripping of trip lever 32 remains effective until the resetting means causes the trip cock device 12 to cut off further venting of said control chamber to permit fluid pressure therein to build up again from the brake pipe, after a delay period, to a value sufficient for overcoming the opposing force of spring 27, such build-up and delay period depending upon the flow capacity of said choke and the capacity of said volume. Upon build-up of fluid pressure in chamber 24 to a predetermined pressure (as determined by the compression rating of spring 27), piston 26 and the valve means associated therewith are restored to the normal cut-off position in which communication 28 is closed and communication 29, both above described, is opened to cut off supply of pressurized fluid to the brake cylinder device 6 and permit said brake cylinder device to be vented to atmosphere by way of conduit 18, double check valve device 8, conduit 22, communication 29 and vent 30, whereby the temporary brake application is released. The duration of the brake application, of course, can be varied by varying the dimensions of the choke 10 and volume 11 within the limitations hereinafter set forth.

If the car is disconnected from the train as for purposes of dumping the car or "humping" operations, the equipment embodying the invention operates in a manner similar to that above described for effecting a brake application at a desired location. But in this case, it is also desirable to keep the brakes applied if it is intended that the car sit in a given location for a period of time. With the car separated from the train and after the equipment has operated in the manner above described for effecting a brake application by tripping the trip lever 32, the brake application does not release automatically upon lapse of a certain time period, as will be immediately explained.

Before the car intended to be "humped" is uncoupled from the train, angle cocks (not shown) at each end of the brake pipe 7 are closed to prevent venting of brake pipe pressure when respective coupling hoses 33 at each end of the car are uncoupled. Thus, reduction of pressure in brake pipe 7 and consequent operation of the brake control valve device to cause a brake application is not effected.

When trip lever 32 is actuated at the approximate designated location along the wayside, control chamber 24 of relay valve device 9 is vented to effect a brake application in the manner above described. After venting of chamber 24 and, along with it, venting of reservoir 11, the trip cock valve device 12 automatically operates to reclose the vent valve (not shown) therein and, therefore, cut off said control chamber from atmosphere. The pressure remaining in isolated section of brake pipe 7 on the set-off car flows through choke 10 to reservoir 11 and control chamber 24 to be equalized therein along with said brake pipe and the connecting conduits, since said brake pipe is disconnected from any charging source (such as the compressor on the locomotive) and, therefore, cannot be maintained at its full charge of 70 p.s.i. Moreover, the volume of reservoir 11 is such as to insure that, after the remaining pressure in brake pipe 7 has equalized, through choke 10, in chamber 24 and said reservoir, the value of such equalized pressure will be less than that required for overcoming spring 27 (in this case, 20 p.s.i.), and the relay valve device 9 will thus remain in its supply position to maintain communication between the emergency portion 3 of reservoir 2 and brake cylinder device 6 and thereby maintain the brake application on the car until said car is subsequently recoupled onto a train and brake pipe pressure is restored to 70 p.s.i. With restoration of pressure in brake pipe 7 to its normal full charge, pressure in control chamber 24 will again build up through choke 10 to cause the relay valve device 9 to be operated to its cut-off position and thereby effect release of the brake application so that the car may be freely moved.

It should be noted that in the case where the car is uncoupled from the train and the trip cock valve device 12 is actuated to effect a brake application, as above described, due to the predesigned flow capacity of choke 10, reduction of brake pipe pressure is restricted by said choke to such a rate as to prevent any likelihood of either an emergency or service brake application occurring by inadvertent operation of the control valve device responsively to such brake pipe reduction.

The choke 10, in addition to the functions above discussed, also functions incidentally upon initiation of an emergency brake application under the control of the engineer's brake valve and the control valve device 1, when pressure in the brake pipe 7 is reduced to zero pressure, to sufficiently delay reduction of fluid pressure in control chamber 24 back through said brake pipe to insure that actuating pressure for the brake cylinder device 6 is supplied under the control of the control valve device 1 via supply conduit 16 and inlet port 17 of the double check valve device 8. During a service application initiated under the control of the engineer's brake valve device, the relay valve device 9 normally remains unaffected because reduction of pressure in brake pipe 7 for a service application and, therefore, in control chamber 24, would normally not be sufficient to permit spring 27 to operate the relay valve device to its supply position.

It should be apparent that the double check valve device 8 is operable to permit operation of the standard brake equipment through control of the brake control valve device 1 without interference from the auxiliary or supplementary equipment. It should be further understood that the brake pipe 7 is continuously connected through any number of cars making up a train and each of said cars which is equipped with the standard brake equipment, may be equipped with the supplementary equipment according to the invention as above specified.

Having now described the invention, what I claim as new and desire to secure by Letters Patent, is:

1. A railway vehicle brake system comprising, in combination:
   (a) a brake pipe normally charged with fluid at a chosen pressure,
   (b) a reservoir charged with fluid under pressure,
   (c) a brake cylinder device effective when pressurized to effect a brake application and when depressurized to effect a release of the brake application,
   (d) fluid pressure responsive control valve means operatively responsive to a reduction from the normal charged pressure in the brake pipe at a rate in excess of a certain rate to effect pressurization of the brake cylinder device from said reservoir and to restoration of the normally charged pressure in the brake pipe to effect depressurization of the brake cylinder device,
   (e) fluid pressure responsive relay valve means having a control chamber chargeable with fluid under pressure from the brake pipe, said relay valve means being operative responsively to reduction of pressure in said chamber below a predetermined value to a fluid pressure supply position communicating fluid pressure from said reservoir to said brake cylinder device via said relay valve means to effect a brake application, and operative responsively to a charging pressure in said chamber exceeding said predetermined value to a cut-off position to effect release of fluid pressure from said brake cylinder device via an atmospheric vent in said relay valve means and thereby release of the brake application, and
   (f) a valve device actuable for effecting reduction of the pressure in the control chamber of said relay valve means to below said predetermined value.

2. A railway vehicle brake system, as defined in claim 1, wherein said valve device comprises a trip cock valve device carried on the vehicle and actuated by engagement with means off the vehicle.

3. A railway vehicle brake system, as claimed in claim 2, further characterized in that said trip cock valve device operates automatically to terminate reduction of the pressure in the said control chamber of the relay valve means upon the elapse of a predetermined interval of time, thereby causing recharging of the control chamber from the brake pipe to a value exceeding said predetermined value and consequent operation of said relay valve means to its cut-off position in which fluid pressure is released from the brake cylinder to effect depressurization thereof and release of the brake application.

4. A railway vehicle brake system, as defined in claim 3, further characterized by a choke of predetermined flow capacity interposed between said brake pipe and said control chamber of the relay valve means and a reservoir of predetermined volume interposed between said choke and said control chamber, said reservoir volume being effective subsequently to the establishment of a brake application effected by actuation of the trip cock valve device on an uncoupled vehicle on which the initially charged brake pipe is isolated from atmosphere, to provide resultant equalization of fluid pressure between the isolated brake pipe and said reservoir at a value less than said predetermined value to thereby cause said relay valve means to be maintained in its said supply position and the brake application to remain effective until brake pipe pressure is restored to said chosen pressure and said choke being effective during flow of fluid pressure therethrough from the brake pipe to restrict said flow to a rate less than said certain rate to thereby preclude operation of said fluid pressure responsive control means to effect pressurization of the brake cylinder device.

5. A railway vehicle brake system, as claimed in claim 1, further characterized by timing means operatively interposed between said control chamber and said brake pipe for limiting the charging of said control chamber of the relay valve means to a rate less than the rate at which fluid pressure therein is reduced by operation of said valve device.

6. A railway vehicle brake system, as claimed in claim 5, further characterized in that said timing means acts to delay reduction of fluid pressure in said control chamber below said predetermined value at such time that a reduction in the brake pipe is effected to a value below said predetermined value.

7. A railway vehicle brake system, as claimed in claim 1, further characterized by a double check valve device for selectively providing alternative communication via which fluid under pressure is supplied to the brake cylinder device under control of said control valve means or said relay valve means according to the predominating fluid pressure supply effected thereby.

8. A railway vehicle brake system comprising, in combination:
   (a) a brake pipe normally charged with fluid at a predetermined pressure,
   (b) a source of fluid under pressure,
   (c) a brake cylinder device operable responsively to supply of fluid pressure thereto and release therefrom for effecting, respectively, a brake application and reelase thereof on the vehicle,
   (d) a brake cylinder supply pipe,
   (e) a brake control valve device operable responsively to a reduction of pressure in said brake pipe below the predetermined pressure for effecting supply of fluid under pressure from the source to said brake cylinder device via said brake cylinder supply pipe and, upon restoration of fluid pressure in the brake pipe to said predetermined pressure, for effecting release of fluid pressure from said brake cylinder device,
   (f) an alternative supply pipe via which pressurized fluid may be supplied to said brake cylinder device from said source,
   (g) a double check valve device operably interposed between said brake cylinder supply pipe and said alternative supply pipe for alternatively connecting one or the other, depending upon which is charged with predominating fluid pressure, to said brake cylinder device,
   (h) a relay valve device having a fluid pressure control chamber and being interposed in said alternative supply pipe between said source of fluid under pressure and said double check valve device,
   (i) said relay valve device having a supply position, in which communication through said alternative supply pipe is open and fluid under pressure is supplied from said source to said brake cylinder device via the double check valve device, and being operable responsively to fluid pressure in said control chamber in excess of a certain pressure to a cut-off position in which said communication is closed and supply of fluid pressure to said brake cylinder device via said alternative supply pipe is terminated and said brake cylinder device is vented to atmosphere, (j) a first conduit connecting said control chamber to said brake pipe for charging said control chamber with fluid pressure, (k) timing means including a choke and reservoir of predetermined flow and volume capacities, respectively, interposed in said first conduit for delaying charging of said control chamber with fluid pressure accordingly to a certain rate determined by the flow and volume capacities of said choke and reservoir, respectively, (l) a trip cock valve device, and (m) a second conduit connecting said control chamber to said trip cock valve device, (n) said trip cock valve device having a trip lever and being operative upon actuation of said trip lever for venting said control chamber at a rapid rate relative to said certain rate for effecting operation of said relay valve device to its said supply position, (o) said trip cock valve device being operative for automatically effecting termination of such venting of said control chamber upon expiration of a predetermined time interval.

9. An auxiliary brake system for use on a railway vehicle equipped with a standard brake system including a brake pipe normally charged with fluid at a predetermined pressure, a source of fluid under pressure, a brake cylinder device operable responsively to supply of fluid pressure thereto and release therefrom for effecting, respectively, a brake application and release thereof on the vehicle, and a brake control valve device operable responsively to a reduction of fluid pressure in the brake pipe below the predetermined pressure for effecting supply of fluid under pressure from the source to the brake cylinder device via a brake cylinder supply pipe upon restoration of fluid pressure in the brake pipe to the predetermined pressure, for effecting release of fluid pressure from the brake cylinder device, said auxiliary brake system comprising the combination of:

(a) first conduit means charged with pressurized fluid from the source, (b) second conduit means via which pressurized fluid from said first conduit means may be supplied to the brake cylinder device, (c) a relay valve device interposed between said first conduit means and said second conduit means and having a control chamber charged with fluid pressure from the brake pipe, (d) said relay valve device being operable responsively to reduction of fluid pressure in said control chamber below a certain value for effecting supply of pressurized fluid from said first conduit means to said second conduit means and to fluid pressure in said control chamber above said certain value for cutting off such supply to said second conduit means and venting it to atmosphere, and (e) a trip cock valve device operable for venting said control chamber in said relay valve device for effecting reduction of fluid pressure therein.

10. An auxiliary brake system, as defined in claim 9, further characterized by third conduit means, via which said control chamber of said relay valve device is charged with fluid pressure from the brake pipe, and timing means interposed in said third conduit means for restricting the rate of flow of pressurized fluid to said control chamber.

11. An auxiliary brake system, as defined in claim 10, wherein said timing means comprises a choke and reservoir, said choke acting to delay reduction of fluid pressure in said control chamber below said certain value at such time that a reduction in the brake pipe is effected to a value below said certain value during operation of the standard brake system.

12. An auxiliary brake system, as set forth in claim 10, wherein said trip cock valve device effects venting of said control chamber at a rate greater than the charging rate determined by said timing means, and is automatically reclosed to terminate such venting upon elapse of a predetermined time interval.

13. An auxiliary brake system, as set forth in claim 9, and further characterized by a double check valve device for selectively providing alternative communication via which fluid under pressure is supplied to the brake cylinder device under control of the brake control valve device or said relay valve device according to the predominating pressure supply effected thereby.

References Cited by the Examiner

UNITED STATES PATENTS 1,192,331  7/1916  Lewis _____ 303—18

OTHER REFERENCES

WABCO Instruction Pamphlet 5071–13 dated August 1963.

EUGENE G. BOTZ, *Primary Examiner.*